Figure 1:
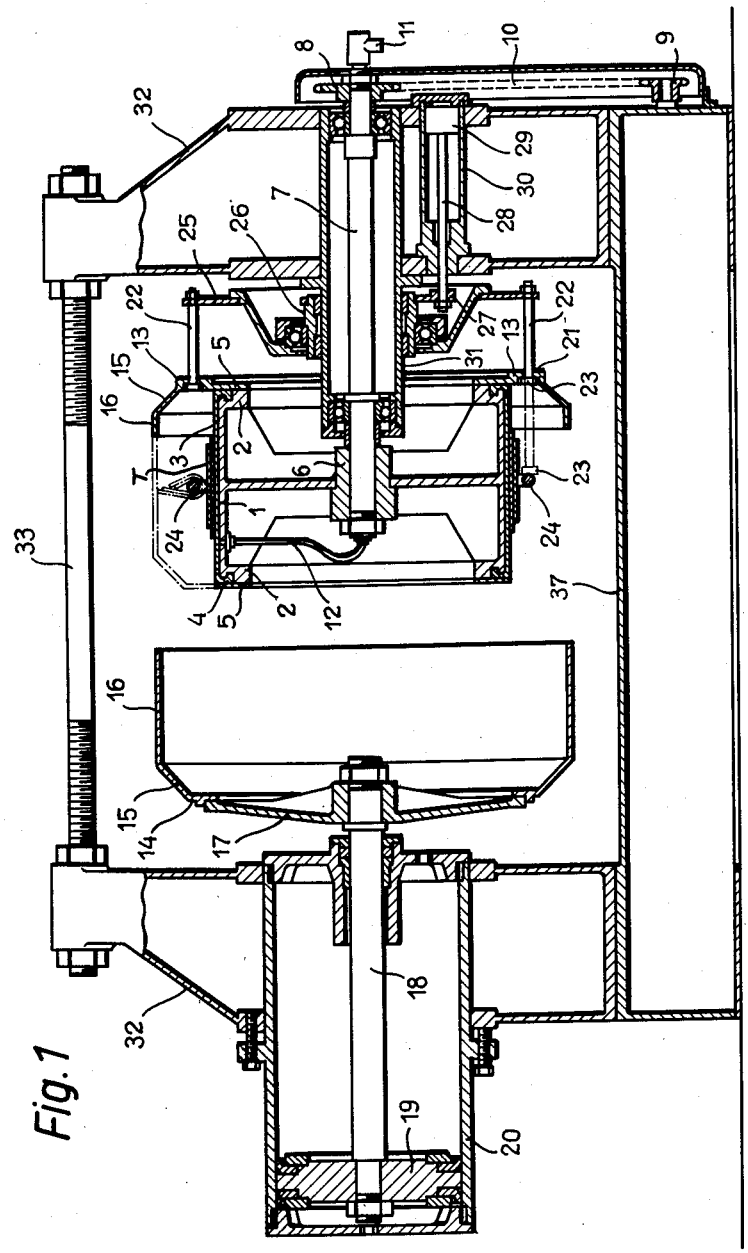

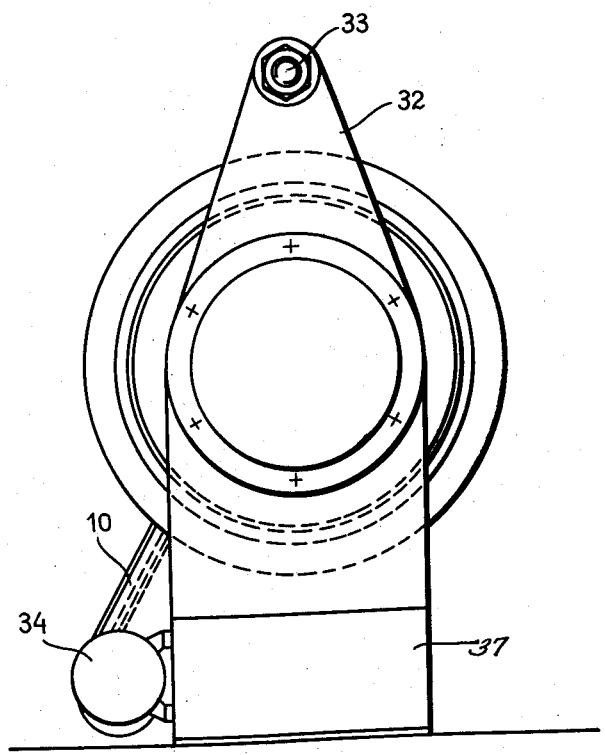

3,011,540
APPARATUS FOR PRODUCING FABRIC FLIPPERS FOR TIRE CASINGS
Marcello Vanzo, Dario Giletta, and Antonio Pacciarini, Milan, Italy, assignors to Pirelli Societa per Azioni, Milan, Italy
Filed May 12, 1958, Ser. No. 734,794
Claims priority, application Italy May 14, 1957
3 Claims. (Cl. 156—422)

It is well known that wrapping of fabric plies about the bead wires in order to form a flipper meets with considerable difficulties when a metal wire cord fabric is employed, owing to the considerable stiffness of such a fabric.

This invention concerns a method and apparatus for building said metal fabric flippers on the bead wires with ease in a quick and satisfactory manner without detrimentally affecting the strength of the fabric plies.

It has been found, according to this invention, that excellent results can be obtained without altering or weakening the wire fabric forming the flipper by gradually turning up the fabric plies for wrapping the bead wire simultaneously throughout the fabric regions situated on the same diameter on either side of the bead wire.

The improved apparatus for carrying out this process comprises a drum including a resilient tubular diaphragm anchored at its ends to rigid end discs or flanges on the drum and two opposite bell-shaped hoods which are brought into reciprocal contact by their facing circumferential edges around the drum after wrapping thereabout the fabic plies and placing centrally of the drum the bead wire to be wrapped.

After the hoods have closed by their juxtaposition the annular space around the drum, the membrane is inflated by a pressure fluid and caused to gradually expand on both sides of the bead wire, thereby lifting the fabric round on the drum along revolution surfaces with respect to the rotational axis of the drum which coincides with the bead wire axis.

The two membrane portions separated by the bead wire meet on expanding the walls of the two bell-shaped components against which they are laid, whereafter their expansion proceeds only towards the middle transverse plane extending through the bend wire where there is no abutment surface, said portions of the membrane tending to abut each other, thereby forcing the fabric plies further forwards, the gradual deformation of the said fabric being constantly equal on both sides and simultaneous throughout all points on a cross section.

In order to reduce the extent of expansion of the membrane, the two opposite hoods are of frustoconical shape and merge by their cylindrical edges adapted to be juxtaposed in operation for closing the annular space around the drum.

A useful result for the same purpose can be obtained by making one or both end discs of the drum axially movable during expansion of the membrane in order to approach the discs to each other.

The apparatus is moreover conveniently provided with means for accurately locating the centered position of the bead wire.

The invention shall be described in detail with reference to the accompanying drawings which diagrammatically show by way of example an embodiment thereof.

FIGURE 1 is a longitudinal sectional view of the apparatus for wrapping the bead wires, and
FIGURE 2 is a side view thereof.

Reference 1 denotes a metal drum having end flanges 2, 3 being the resilient flexible tubular membrane, the edges 4 of which are secured to the flanges 2 of the drum.

A connecting pipe 12 is adapted for supplying compressed air to the gap between the rigid cylindrical surface 1 on the drum and the resilient tubular membrane 3.

The membrane is secured to the end flanges 2 by means of rings 5 which are bolted to said flanges.

The drum 1 is assembled on the hub 6, which is keyed to the hollow shaft 7 provided at one end with a nipple 11 for the compressed air supply pipe, the delivery of which is adjustable through suitable cocks not shown.

The pipe 12 is connected to the opposite end of the shaft 7. The shaft 7 is rotated by a motor-reducing gear unit 34 from which motion is transmitted to the shaft through the chain 10 and sprocket gears 8 and 9. Reference 13 denotes the hood secured to the drum, 14 being the axially movable hood mounted on a ribbed disc 17 keyed to a shaft 18 which upon wrapping of the narrow fabric layers T on the drum 3 and assembly of the bead wire 24 is moved forward to cause the edge of its cylindrical portion 16 to abut the edge of the corresponding cylindrical portion 16 on the stationary hood 13. The hoods 13 and 14 moreover comprise each a frusto-conical portion 15 for connection to the respective hub sections.

In order to move the movable hood axially, the shaft 18 is provided with a piston 19 slidable in a horizontal double-acting cylinder 20 carried by the machine frame.

In order to accurately locate the bead wire 24, rods 22 are provided, which are axially slidable in holes 21 bored in the peripheral portion of the ring 5 carrying the stationary hood and having a head portion 23 adapted to abut the bead 24 in order to arrest it in its accurate diametrical middle position on the drum on which the fabric layers are wound. On restoring the rods 22 to their initial position upon accurate locating of the bead wire, the heads 23 on the rods 22 enter suitable seats in the radial ring 13. The rods 22 are secured to a disc 25 carried by a slide 26 which causes the rods to axially move and is guided on the cylinder 31. The slide 26 is provided with an arm 27 connecting it to the rod 28 on a piston 29 which may be moved by the action of compressed air in a cylinder 30 in order to cause the rods to move forward as air enters the cylinder on one side of the piston, the rods being withdrawn as air enters the cylinder on the other piston side. The apparatus comprises a foundation 37 and two side walls 32 adapted to take up axial thrust, for which purpose they are interconnected by the tie-rod 33.

What we claim is:

1. Apparatus for wrapping fabric about a bead wire to produce a fabric flipper for a tire casing comprising a rotatable drum having a rigid cylindrical surface, means for rotating said drum, a resilient tubular membrane covering said cylindrical surface and tightly secured at its edges to the opposite ends of said drum, means for introducing fluid under pressure between said membrane and the cylindrical surface of said drum so as to inflate said membrane and a pair of opposite bell-shaped hoods mounted in coaxial relationship to said drum, said hoods having internal recesses larger in diameter than said drum and axially movable towards one another so as to enclose said drum.

2. Apparatus as set forth in claim 1, wherein each hood includes a substantially radially extending hub portion and a circumferential portion comprising a frustoconical section adjacent said hub portion and a terminal cylindrical section, the free edges of which are designed to abut the free edges of the terminal cylindrical section of the circumferential portion of the other hood.

3. Apparatus for wrapping fabric about a bead wire to produce a fabric flipper for a tire casing comprising a rotatable drum having a rigid cylindrical surface, a resilient tubular membrane covering said cylindrical surface and tightly secured at its edges to the opposite ends of said drum, means for introducing fluid under pressure between said membrane and the cylindrical surface of said drum so as to inflate said membrane, and a pair of opposite bell-shaped hoods mounted in coaxial relationship to said drum, said hoods having internal recesses larger in diameter than said drum and axially movable relative to one another so as to enclose said drum, one of said hoods being secured to said drum and being of smaller axial length than the other hood, said other hood being axially movable towards and away from said drum and said one hood, a series of parallel rods arranged in a circular row projecting inside said one hood and slidably supported by the latter, means for moving said rods simultaneously and axially from an operative position where said rods project over said drum to an inoperative position where said rods are retracted, the ends of said rods in the operative positions thereof serving to locate on said drum the bead wire about which the fabric is to be wrapped, means being further provided for displacing said other hood towards said one hood after retracting of said rods to their inoperative positions.

References Cited in the file of this patent

UNITED STATES PATENTS

| | | |
|---|---|---|
| 1,551,040 | Marquette | Aug. 25, 1925 |
| 1,615,025 | Marietta | Jan. 18, 1927 |
| 1,755,933 | Pfeiffer | Apr. 22, 1930 |
| 2,517,889 | Kuffler | Aug. 8, 1950 |
| 2,565,071 | Frazier | Aug. 21, 1951 |
| 2,717,628 | Wikle | Sept. 13, 1955 |
| 2,814,330 | Vanzo et al. | Nov. 26, 1957 |
| 2,814,331 | Vanzo et al. | Nov. 26, 1957 |

FOREIGN PATENTS

| | | |
|---|---|---|
| 175,754 | Great Britain | Feb. 20, 1922 |
| 207,915 | Australia | May 1, 1957 |